(12) United States Patent
Yoshida

(10) Patent No.: US 10,101,728 B2
(45) Date of Patent: Oct. 16, 2018

(54) THREE-DIMENSIONAL PRINTING SYSTEM AND METHOD OF PRINTING A THREE-DIMENSIONAL OBJECT

(71) Applicant: Roland DG Corporation, Hamamatsu-shi, Shizuoka (JP)

(72) Inventor: Makoto Yoshida, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 196 days.

(21) Appl. No.: 15/084,835

(22) Filed: Mar. 30, 2016

(65) Prior Publication Data
US 2016/0288425 A1 Oct. 6, 2016

(30) Foreign Application Priority Data
Apr. 1, 2015 (JP) .................. 2015-075076

(51) Int. Cl.
*G05B 19/4099* (2006.01)
*B33Y 50/00* (2015.01)

(52) U.S. Cl.
CPC .......... *G05B 19/4099* (2013.01); *B33Y 50/00* (2014.12); *G05B 2219/35134* (2013.01); *G05B 2219/49007* (2013.01); *G05B 2219/50093* (2013.01); *Y02P 90/265* (2015.11)

(58) Field of Classification Search
CPC ...... G05B 19/4099; G05B 2219/50093; G05B 2219/49007; G05B 2219/35134; B33Y 50/00; Y02P 90/265; G06F 19/00; G06F 2217/00; G06T 19/00; G06T 19/003; G06T 19/006; G06T 19/20; G06T 17/00; G06T 17/20; G06T 7/00; G06T 7/10; G06T 7/11; G06T 7/12; G06T 7/13

USPC ...... 425/162, 375, 174, 174.4; 700/118–120, 700/163
See application file for complete search history.

(56) References Cited

U.S. PATENT DOCUMENTS

| 5,182,715 A * | 1/1993 | Vorgitch ............... G06F 17/246 264/401 |
| 5,610,824 A * | 3/1997 | Vinson ................. G06F 17/246 425/174.4 |
| 6,215,493 B1 * | 4/2001 | Fujita ...................... G06T 17/00 345/418 |

FOREIGN PATENT DOCUMENTS

| JP | 2003-535712 A | 12/2003 |
| WO | 00/52624 A1 | 9/2000 |

* cited by examiner

*Primary Examiner* — Matthew J Daniels
*Assistant Examiner* — Leith S Shafi
(74) *Attorney, Agent, or Firm* — Keating & Bennett, LLP

(57) ABSTRACT

In a region determination device and method, when an island contour of a slice model crosses a scanning line in a first direction, the value of an internal level n is increased by a predetermined value. When the island contour crosses the scanning line in a second direction different the first direction, the value of the internal level n is decreased by the predetermined value. When a hole contour of the slice model crosses the scanning line in the second direction, the value of the internal level n is assigned to a temporary retain variable m and "0" is substituted for the internal level n. When the hole contour crosses the scanning line in the first direction, the value of the temporary retain variable m is assigned back to the internal level n. A region corresponding to a value of the internal level n, set as above, that is not 0 is determined to be a printing region, and a region corresponding to the value of the internal level n that is 0 is determined to be a non-printing region.

11 Claims, 9 Drawing Sheets

THREE-DIMENSIONAL PRINTING SYSTEM AND METHOD OF PRINTING A THREE-DIMENSIONAL OBJECT

CROSS REFERENCE OF RELATED APPLICATION

The present application claims priority from Japanese Patent Application No. 2015-075076, filed on Apr. 1, 2015, which is incorporated by reference herein in its entirety.

BACKGROUND OF THE INVENTION

1. Field of the Invention

The present invention relates to a region determination device for a slice model, a three-dimensional printing system, and a region determination method for a slice model.

2. Description of the Related Art

Conventionally, a three-dimensional printing device that prints a three-dimensional printing object is known. This type of three-dimensional printing device uses, for example, a computer-aided design device (CAD device) to create data on a three-dimensional model, which is usable to print a three-dimensional printing object (see, for example, Japanese PCT National-Phase Patent Publication No. 2003-535712). The three-dimensional model is sliced at a predetermined interval to create data of a slice model corresponding to a cross-sectional shape of the three-dimensional printing object. The three-dimensional printing device sequentially stacks resin material objects each having a cross-sectional shape corresponding to the data of the slice model while curing the resin material, and thus prints a desired three-dimensional printing object.

FIG. 11A is a plan view of a three-dimensional printing object A100. FIG. 11B is a side view of the three-dimensional printing object A100. The three-dimensional printing object A100 has a shape including two cylindrical objects having different diameters stacked in an up-down direction. The three-dimensional printing object A100 has a central part thereof cut out as seen in the plan view. FIG. 12 shows a slice model SM100 obtained as a result of slicing the three-dimensional printing object A100 at a position PT100 shown in FIG. 11B. In each of FIG. 11A, FIG. 11B and FIG. 12, the hatched region is a printing region. The slice model SM100 is defined by contours representing the shape of the three-dimensional printing object A100. The contours include, for example, a contour L101 representing an outer profile of the printing region of the three-dimensional printing object A100 and a contour L102 representing the shape of a hole in the three-dimensional printing object A100. In the following description, a contour representing an outer profile of a three-dimensional printing object will be referred to as an "island contour", and a contour representing the shape of a hole in a three-dimensional printing object will be referred to as a "hole contour".

In FIG. 12, a region D101 between the island contour L101 and the hole contour L102 is a printing region. A region D102 inner to the hole contour L102 represents the hole. The region D102 is a non-printing region, which is not to be printed.

In, for example, the slice model SM100, an advancing direction is set for each of the contours L101 and L102 in order to distinguish whether each of the contours L101 and L102 is an island contour or a hole contour. For example, the advancing direction of the island contour L101 is set to a clockwise direction. The advancing direction of the hole contour L102 is set to a counterclockwise direction. A computer determines whether a contour is an island contour or a hole contour based on the advancing direction of the contour.

The computer sets a straight scanning line SL100 that crosses the contours L101 and L102 and is to be scanned in a predetermined direction (e.g., in FIG. 12, in the left-to-right direction) in order to divide the region of the slice model SM100 into a printing region and a non-printing region. Also in the computer, a variable n (herein, referred to as an "internal level n") is set that is usable to divide the region of the slice model SM100 into a printing region and a non-printing region. For example, the internal level n has an initial value of "0". When the scanning line SL100 is scanned in a predetermined direction and crosses the contours L101 and L102, the computer determines the advancing direction of the contours L101 and L102 crossing the scanning line SL100. In this example, when the contour crosses the scanning line SL100 in a first direction (in FIG. 12, in the bottom-to-top direction), the value of the internal level n is increased by "1". By contrast, when the contour crosses the scanning line SL100 in a second direction (in FIG. 12, in the top-to-bottom direction) opposite to the first direction, the value of the internal level n is decreased by "1". In the case of the slice model SM100 shown in FIG. 12, the value of the internal level n is increased by "1" at intersections P101 and P103. The value of the internal level n is decreased by "1" at intersections P102 and P104. The computer determines a region corresponding to a value of the internal level n that is not "0" (in FIG. 12, region D101) to be a printing region. The computer determines a region corresponding to the value of the internal level n that is "0" (in FIG. 12, region D102) to be a non-printing region.

FIG. 13 shows a slice model SM110 obtained as a result of slicing the three-dimensional printing object A100 at a position PT110 shown in FIG. 11B. In FIG. 11B, the position PT110 is a border between the two cylindrical objects included in the three-dimensional printing object A100. Therefore, the slice model SM110 shown in FIG. 13 includes an island contour L111 representing a profile of a top end of the lower cylindrical object and an island contour L112 representing a profile of a bottom end of the upper cylindrical object. In FIG. 13, the hatched regions are printing regions. In the slice model SM110 shown in FIG. 13, the island contour L112 is provided between the island contour L111 and a hole contour L113. In this example, a region D111 between the island contour L111 and the island contour L112, and a region D112 between the island contour L112 and the hole contour L113, each of them is a printing region. By contrast, a region D113 inner to the hole contour L113 is a non-printing region.

The computer sets a scanning line SL110 crossing the contours of the slice model SM110. The computer causes the scanning line SL110 to be scanned to change the value of the internal level n, and thus divides the region of the slice model SM110 into a printing region and a non-printing region. In this process, the internal level n is increased by "1" at each of intersections P111 and P112. As a result, the value of the internal level n is "2" at the intersection P112. At an intersection P113, the value of the internal level n is decreased by "1". As a result, the value of the internal level n is "1". In the same manner, the value of the internal level n is "2" at an intersection P114. At an intersection P115, the value of the internal level n is "1". At an intersection P116, the value of the internal level n is "0".

The computer determines a region corresponding to the value of the internal level n that is "0" to be a non-printing region. In the slice model SM110, the region D113 should be a non-printing region. However, the value of the internal level n corresponding to the region D113 is "1", and therefore, the computer may undesirably determine that the region D113 is a printing region.

SUMMARY OF THE INVENTION

Preferred embodiments of the present invention provide a region determination device for a slice model, a three-dimensional printing system and a region determination method for a slice model capable of appropriately dividing the region of a slice model, obtained as a result of slicing a three-dimensional model of a three-dimensional printing object to be printed, into a printing region and a non-printing region.

A region determination device for a slice model according to a preferred embodiment of the present invention divides a region of the slice model into a printing region to be printed and a non-printing region not to be printed, the slice model being obtained as a result of slicing a three-dimensional model of a three-dimensional printing object at a predetermined interval and being defined by contours representing profiles of the three-dimensional printing object. The contours include an island contour representing a shape of an outer profile of the printing region of the three-dimensional printing object and a hole contour representing a shape of a hole in the three-dimensional printing object. The region determination device includes a storage processor, an advancing direction setting processor, a scanning line setting processor, an intersection specifying processor, a contour determination processor, a first internal level setting processor, a second internal level setting processor, and a region determination processor. The storage processor is configured or programmed to store the slice model and an internal level variable and a temporary retain variable. The advancing direction setting processor is configured or programmed to set an advancing direction for the island contour of the slice model stored by the storage processor and a different advancing direction for the hole contour of the slice model. The scanning line setting processor is configured or programmed to set, for the slice model stored by the storage processor, a scanning line directed in a predetermined direction so as to cross the contours. The intersection specifying processor is configured or programmed to specify intersections at which the contours and the scanning line cross each other. The contour determination processor is configured or programmed to determine whether each of the contours crossing the scanning line at the intersections specified by the intersection specifying processor is the island contour or the hole contour. The first internal level setting processor is configured or programmed to, in the case where the contour crossing the scanning line is determined to be the island contour by the contour determination processor, when the island contour crosses the scanning line in a first direction, increase a value of the internal level variable by a predetermined value, and when the island contour crosses the scanning line in a second direction opposite to the first direction, decrease the value of the internal level variable by the predetermined value. The second internal level setting processor is configured or programmed to, in the case where the contour crossing the scanning line is determined to be the hole contour by the contour determination processor, when the hole contour crosses the scanning line in the second direction, assign the value of the internal level variable to the temporary retain variable and then substitute "0" for the internal level variable, and when the hole contour crosses the scanning line in the first direction, assign a value of the temporary retain variable back to the internal level variable. The region determination processor is configured or programmed to determine a region, corresponding to a value of the internal level variable that is not 0, to be the printing region and determine a region, corresponding to the value of the internal level variable that is 0, to be the non-printing region, the internal level variable being set by the first internal level setting processor and the second internal level setting processor.

According to the region determination device, when the hole contour crosses the scanning line in the second direction, the second internal level setting processor assigns the value of the internal level to the temporary retain variable and then substitutes "0" for the internal level variable. When the hole contour crosses the scanning line in the first direction, the second internal level setting processor assigns the value of the temporary retain variable back to the internal level variable. Therefore, in the slice model, the value of the internal level variable corresponding to the non-printing region, which is not to be printed, is set to "0" with certainty. For this reason, even the region of the slice model SM110 shown in FIG. 13, in which the island contour L111 and the hole contour L113 have another island contour L112 therebetween, may be divided into a printing region and a non-printing region with certainty.

According to a preferred embodiment of the present invention, the advancing direction setting processor is configured or programmed to set a clockwise direction as the advancing direction of the island contour and set a counterclockwise direction as the advancing direction of the hole contour. The contour determination processor is configured or programmed to, in the case where the advancing direction of the contour crossing the scanning line at the intersection is the clockwise direction, determine the contour to be the island contour, and in the case where the advancing direction of the contour crossing the scanning line at the intersection is the counterclockwise direction, determine the contour to be the hole contour.

According to the above-described preferred embodiment, it is easily determined whether the contour crossing the scanning line is an island contour or an hole contour by determining whether the advancing direction of the contour crossing the scanning line is clockwise or counterclockwise.

According to another preferred embodiment of the present invention, the first internal level setting processor is configured or programmed to, when the island contour crosses the scanning line in the first direction, increase the value of the internal level variable by 1, and when the island contour crosses the scanning line in the second direction, decrease the value of the internal level variable by 1.

According to the above-described preferred embodiment, when the island contour crosses the scanning line, the value of the internal level variable is changed more easily.

According to still another preferred embodiment of the present invention, the scanning line setting processor is configured or programmed to set a plurality of the scanning lines for the slice model.

According to the above-described preferred embodiment, the region of the slice model is divided into a printing region and a non-printing region.

A three-dimensional printing system according to a preferred embodiment of the present invention includes a three-dimensional printing device that prints a three-dimensional printing object, and a region determination device for a slice model according to any one of the preferred embodiments of the present invention described above.

According to a three-dimensional printing system, a region determination device for a slice model according to any one of the preferred embodiments of the present invention described above.

A region determination method for a slice model according to a preferred embodiment of the present invention divides a region of the slice model into a printing region to be printed and a non-printing region not to be printed, the slice model being obtained as a result of slicing a three-dimensional model of a three-dimensional printing object to be printed at a predetermined interval, and being defined by contours representing profiles of the three-dimensional printing object. The contours include an island contour representing a shape of an outer profile of the printing region of the three-dimensional printing object and a hole contour representing a shape of a hole in the three-dimensional printing object. The region determination method includes a storage step, an advancing direction setting step, a scanning line setting step, an intersection specifying step, a contour determination step, a first internal level setting step, and a second internal level setting step, and a region determination step. In the storage step, the slice model is stored. In the advancing direction setting step, an advancing direction is set for the island contour of the slice model stored in the storage step, and a different advancing direction is set for the hole contour of the slice model. In the scanning line setting step, a scanning line directed in a predetermined direction so as to cross the contours is set for the slice model stored in the storage step. In the intersection specifying step, intersections at which the contours and the scanning line cross each other are specified. In the contour determination step, it is determined whether each of the contours crossing the scanning line at the intersections specified in the intersection specifying step is the island contour or the hole contour. In the first internal level setting step, in the case where the contour crossing the scanning line is determined to be the island contour in the contour determination step, when the island contour crosses the scanning line in a first direction, a value of the internal level variable is increased by a predetermined value, and when the island contour crosses the scanning line in a second direction opposite to the first direction, the value of the internal level variable is decreased by the predetermined value. In the second internal level setting step, in the case where the contour crossing the scanning line is determined to be the hole contour in the contour determination step, when the hole contour crosses the scanning line in the second direction, the value of the internal level variable is assigned to a temporary retain variable, and then "0" is substituted for the internal level variable, and when the hole contour crosses the scanning line in the first direction, a value of the temporary retain variable is assigned back to the internal level variable. In the region determination step, a region, corresponding to a value of the internal level variable that is not 0, is determined to be the printing region and a region, corresponding to the value of the internal level variable that is 0, is determined to be the non-printing region, the internal level variable being set in the first internal level setting step and the second internal level setting step.

According to still another preferred embodiment of the present invention, in the advancing direction setting step, a clockwise direction is set as the advancing direction of the island contour and a counterclockwise direction is set as the advancing direction of the hole contour. In the contour determination step, in the case where the advancing direction of the contour crossing the scanning line at the intersection is the clockwise direction, the contour is determined to be the island contour, and in the case where the advancing direction of the contour crossing the scanning line at the intersection is the counterclockwise direction, the contour is determined to be the hole contour.

According to still another preferred embodiment of the present invention, in the first internal level setting step, when the island contour crosses the scanning line in the first direction, the value of the internal level variable is increased by 1, and when the island contour crosses the scanning line in the second direction, the value of the internal level variable is decreased by 1.

According to still another preferred embodiment of the present invention, in the scanning line setting step, a plurality of the scanning lines are set for the slice model.

According to still another preferred embodiment of the present invention, the island contour includes a first island contour representing an outer profile of the printing region and a second island contour provided between the first island contour and the hole contour and representing an outer profile of the printing region. The internal level variable has an initial value of 0. In the first internal level setting step, when the first island contour crosses the scanning line in the first direction, the value of the internal level variable is increased by 1, and when the second island contour crosses the scanning line in the first direction, the value of the internal level variable is increased by 1, so that the value of the internal level variable is 2. In the second internal level setting step, when the hole contour crosses the scanning line in the second direction, the value of the internal level variable, which is 2, is assigned to the temporary retain variable and then 0 is substituted for the internal level variable, and when the hole contour crosses the scanning line in the first direction, the value of the temporary retain variable, which is 2, is assigned back to the internal level variable. In the first internal level setting step, when the second island contour crosses the scanning line in the second direction, the value of the internal level variable is decreased by 1, so that the value of the internal level variable is 1, and when the first island contour crosses the scanning line in the second direction, the value of the internal level variable is decreased by 1, so that the value of the internal level variable is 0.

According to the above-described preferred embodiment, when the value of the internal level variable is "2" and the hole contour crosses the scanning line in the second direction, the value of the internal level variable (=2) is assigned to the temporary retain variable and then "0" is substituted for the internal level variable. When the hole contour crosses the scanning line in the first direction, the value of the temporary retain variable (=2) is assigned back to the internal level variable. Therefore, even in the case where the slice mode is defined by the first island contour, the hole contour and the second island contour provided between the first island contour and the hole contour, the value of the internal level variable corresponding to the non-printing region, which is not to be printed, is set to "0" with certainty. For this reason, the region of the slice model is divided into a printing region and a non-printing region with certainty.

According to various preferred embodiments of the present invention, a region of a slice model obtained as a result of slicing, at a predetermined interval, a three-dimensional model of a three-dimensional printing object to be printed is divided into a printing region and a non-printing region appropriately.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, three-dimensional printing systems including a region determination device for a slice model (hereinafter, referred to as a region determination device") according to preferred embodiments of the present invention will be described. Needless to say, the preferred embodiment described below is not intended to limit the present invention to any specific preferred embodiment in any way. Elements and features having identical functions bear identical reference signs, and the same descriptions may be omitted appropriately or simplified.

Figure 1:
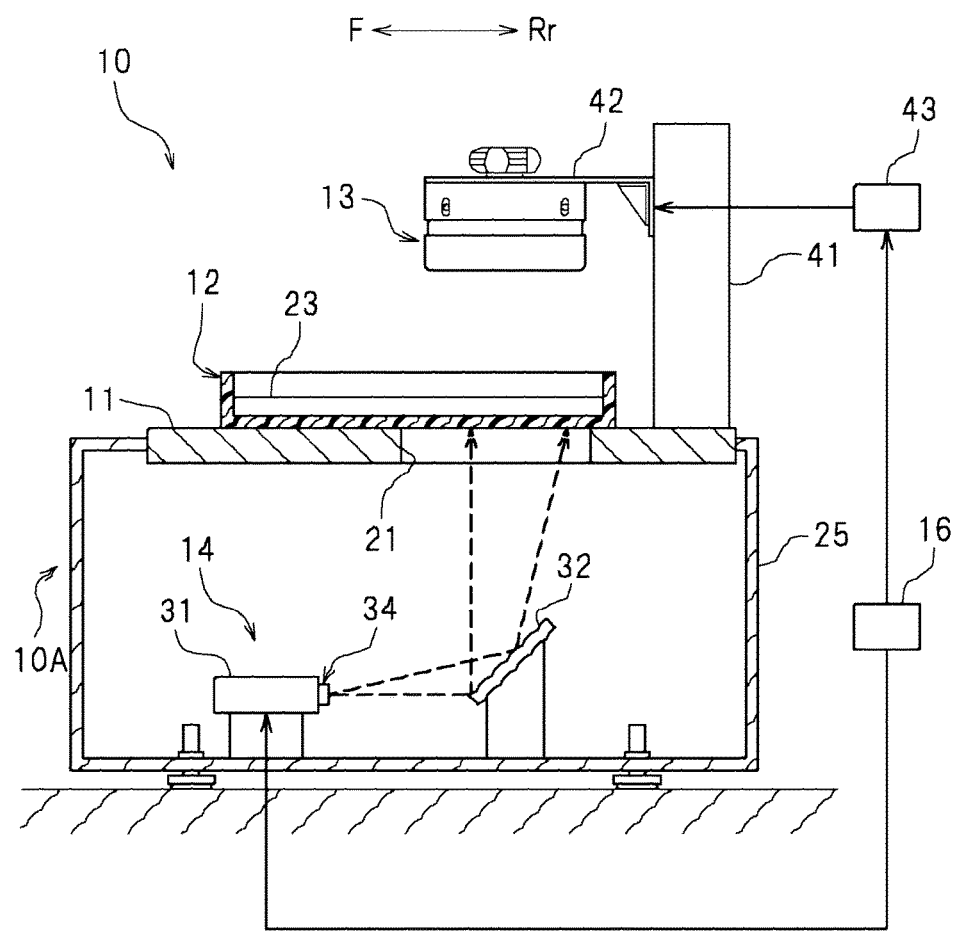
FIG. 1 is a cross-sectional view of a three-dimensional printing system according to an preferred embodiment of the present invention.
Figure 2:
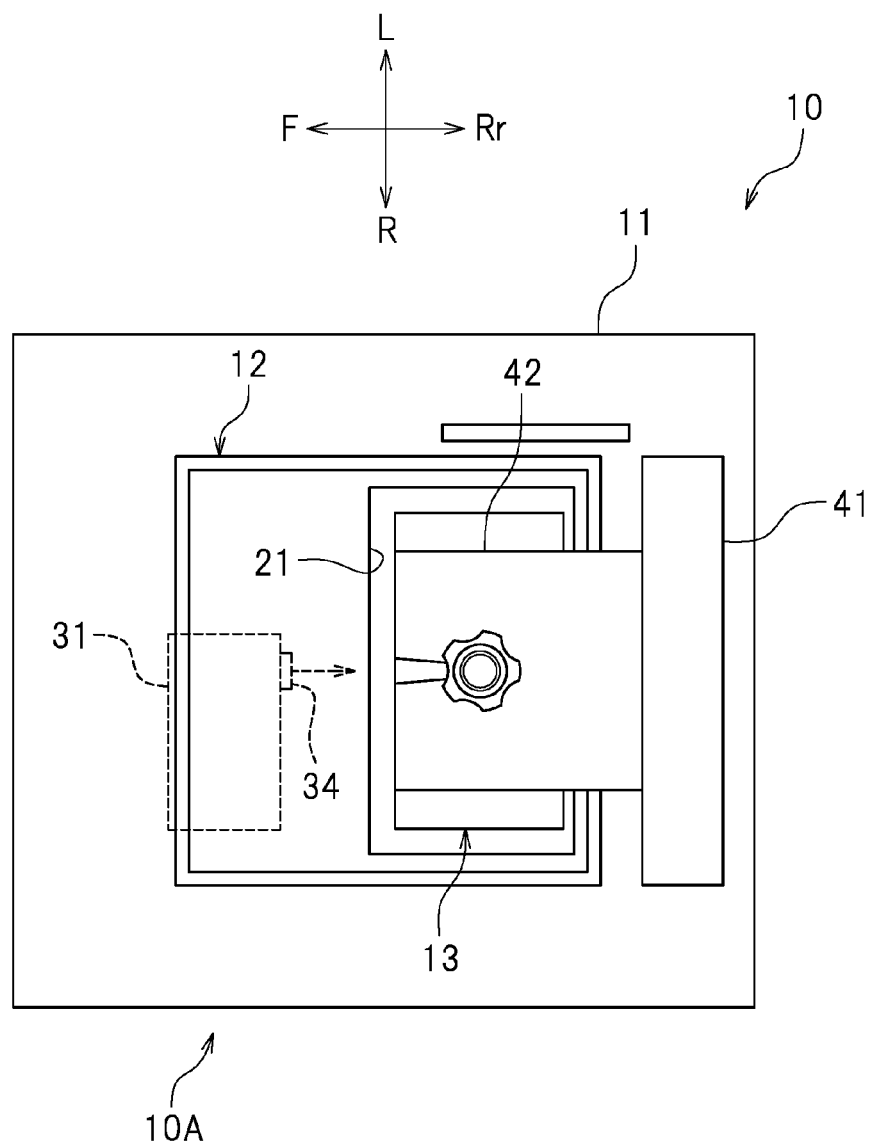
FIG. 2 is a plan view of a three-dimensional printing system according to a preferred embodiment of the present invention.
Figure 3:
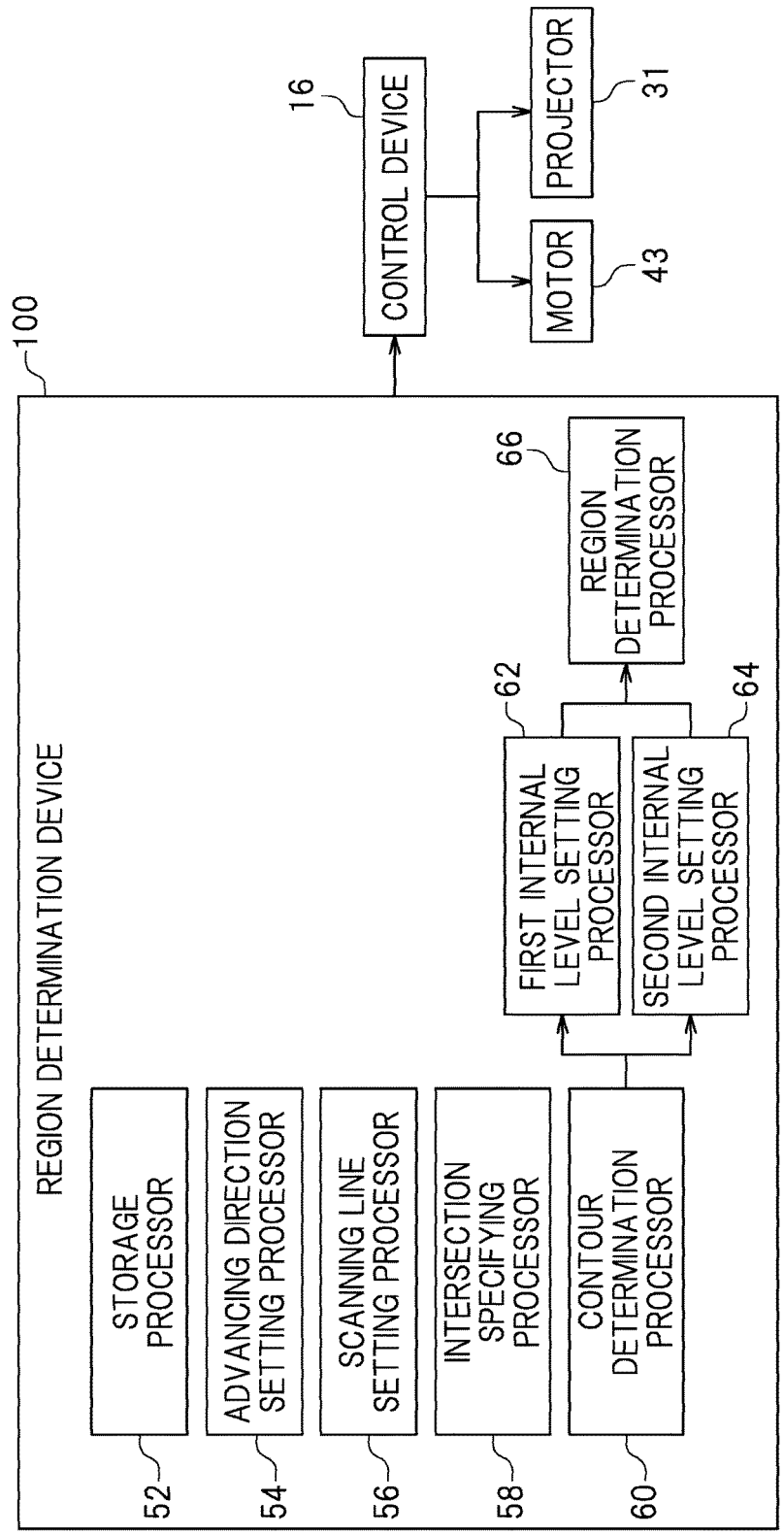
FIG. 3 is a block diagram of a three-dimensional printing system according to a preferred embodiment of the present invention.

FIG. 1 is a cross-sectional view of a three-dimensional printing system 10 according to a preferred embodiment of the present invention. FIG. 2 is a plan view of the three-dimensional printing system 10. FIG. 3 is a block diagram of the three-dimensional printing system 10. In the drawings, letters F, Rr, L and R respectively represent front, rear, left and right. These directions are provided merely for the sake of convenience, and do not limit the form of installment of the three-dimensional printing system 10 in any way.

The three-dimensional printing system 10 is a system that prints a three-dimensional printing object. As shown in FIG. 1, the three-dimensional printing system 10 includes a three-dimensional printing device 10A and a region determination device 100 (see FIG. 3). In this preferred embodiment, a cross-sectional shape of a three-dimensional printing object is prepared in advance. The three-dimensional printing device 10A cures a photocurable resin in a liquid state to form a resin layer having a shape corresponding to the prepared cross-sectional shape and sequentially stacks such resin layers to print a three-dimensional printing object. Herein, the term "cross-sectional shape" refers to the shape of a cross-section obtained as a result of slicing a three-dimensional printing object at a predetermined thickness (e.g., about 0.1 mm). A "photocurable resin" is a resin that is cured when being irradiated with light including a light component having a predetermined wavelength. The three-dimensional printing device 10A includes a table 11, a tank 12, a holder 13, an optical device 14, and a controller 16.

The table 11 is supported by a case 25. The table 11 is provided with an opening 21 through which light to be directed to a photocurable resin 23 is allowed to pass. The tank 12 accommodates the photocurable resin 23 in a liquid state. The tank 12 is placed on the table 11 so as to be attachable to the table 11. As shown in FIG. 2, the tank 12 covers the opening 21 of the table 11 when placed on the table 11. The tank 21 may be formed of a light-transmissive material. The tank 12 may be formed of, for example, a transparent material.

As shown in FIG. 1, the holder 13 is located above the tank 12 and above the opening 21 of the table 11. The holder 13 is movable up and down so as to be immersed in the photocurable resin 23 in the tank 12 when being lowered and to pull up the photocurable resin 23, cured as a result of being irradiated with light, when being raised up. In this example, the table 11 is provided with a column 41 extending in an up-down direction. A slider 42 is attached to the front of the column 41. The slider 42 is movable up and down along the column 41. The slider 42 is movable up and down by a motor 43. In this example, the holder 13 is attached to the slider 42. The holder 13 is located to the front of the column 41. The holder 31 is movable up and down by the motor 43.

The optical device 14 is located below the table 11. The optical device 14 directs light having a predetermined wavelength toward the photocurable resin 23 in a liquid state that is accommodated in the tank 12. The optical device 14 is accommodated in the case 25 provided below the table 11. The optical device 14 includes a projector 31 and a mirror 32. The projector 31 is a light source emitting light. The optical device 14 is located below a front portion of the table 11. The projector 31 is located to the front of the holder 13. A lens 34 is located to the rear of the projector 31. The projector 31 emits light in a front-to-rear direction via the lens 34. The mirror 32 reflects the light, emitted from the projector 31, toward the tank 12. The mirror 32 is located below the opening 21 in the table 11 and to the rear of the projector 31. The light emitted from the projector 31 is reflected by the mirror 32 and is directed toward the photocurable resin 23 in the tank 12 via the opening 21 of the table 11.

The controller 16 is connected with the motor 43 controlling the slider 42, having the holder 13 attached thereto, to be movable up and down, and is also connected with the projector 31 in the optical device 14. The controller 16 is configured or programmed to drive the motor 43 to move the slider 42 and the holder 13 upward or downward. The controller 16 controls the energy, luminosity, amount, wavelength band, and shape of the light emitted from the projector 31, the position of the photocurable resin 23 that is to be irradiated with the light, the timing to emit the light, and the like. There is no specific limitation on the structure of the controller 16. For example, the controller 16 may be a computer and may include a central processing unit (hereinafter, referred to as a "CPU") and a ROM, a RAM or the like storing a program or the like to be executed by the CPU.

The structure of the three-dimensional printing device 10A in this preferred embodiment has been described. Three-dimensional printing device 10A in this preferred embodiment prepares data of a three-dimensional model corresponding to a three-dimensional printing object to be printed (hereinafter, such data will be referred to as "printing object model"). The printing object model is sliced in a horizontal direction at a predetermined interval to prepare a plurality of units of data of two-dimensional slice models respectively corresponding to cross-sectional shapes of the three-dimensional printing object. The direction in which the printing object model is sliced is not limited to the horizontal direction. The direction in which the printing object model is sliced may be, for example, a vertical direction. In this example, the "data of the slice model" is STL data. Hereinafter, the data of the two-dimensional slice model may also be referred to simply as a "slice model". In this example, the three-dimensional printing device 10A cures the photocurable resin 23 in a liquid state to form a resin layer having a shape corresponding to the cross-sectional shape of the slice model and sequentially stacks such resin layers to print a three-dimensional printing object.

Figure 11A:
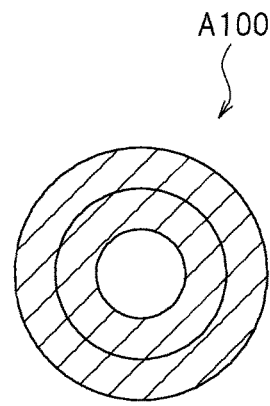
FIG. 11A shows a conventional technology and is a plan view of a three-dimensional printing object.
Figure 11B:
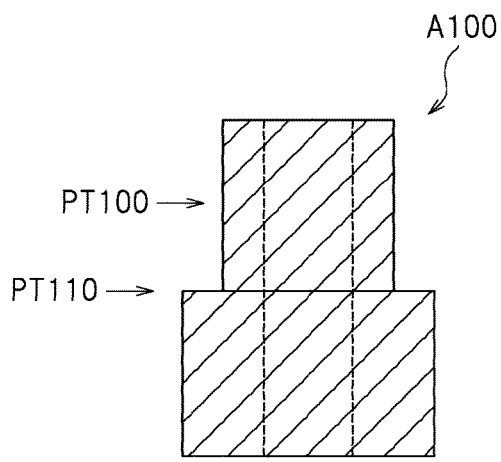
FIG. 11B shows the conventional technology and is a side view of the three-dimensional printing object.
Figure 12:
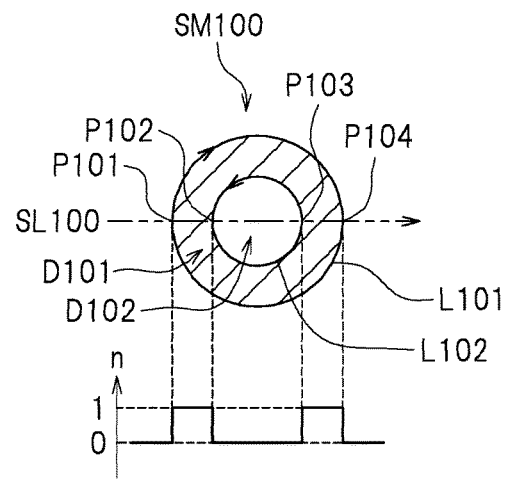
FIG. 12 shows the conventional technology and shows a slice model obtained as a result of slicing the three-dimensional printing object at a position PT100 shown in FIG. 11B.
Figure 13:
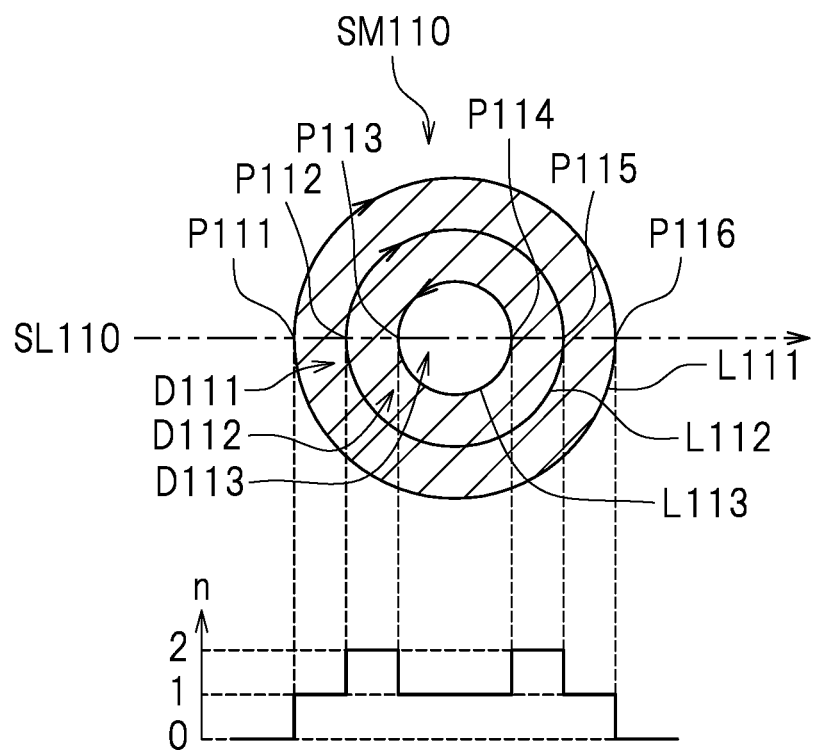
FIG. 13 shows the conventional technology and shows a slice model obtained as a result of slicing the three-dimensional printing object at a position PT110 shown in FIG. 11B.

As shown in FIG. 12, for example, the slice model SM100 of the three-dimensional printing object A100 to be printed is defined by contours representing the shape of the three-dimensional printing object A100 (see FIG. 11A and FIG. 11B). The contours include, for example, the island contour L101 representing the outer profile of the printing region and the hole contour L102 representing the shape of the hole in the three-dimensional printing object A100. The region D101 inner to the island contour L101 and outer to the hole contour L102 is a region for which the photocurable resin 23 is to be cured, namely, a printing region (hatched region in FIG. 12). By contrast, the region D102 inner to the hole contour L102 (in the case where there is another island contour inner to the hole contour L102, the region D102 is inner to the hole contour L102 and outer to the another island contour) is a region representing the hole. The region D102 is a region for which the photocurable resin 23 is not to be cured, namely, a non-printing region, which is not to be printed.

In this example, an advancing direction is set for each of the island contour L101 and the hole contour L102 of the slice model SM100 in order to distinguish the contours L101 and L102 from each other. For example, the advancing direction of the island contour L101 is a clockwise direction. The advancing direction of the hole contour L102 is a counterclockwise direction. It is sufficient that the advancing direction of the island contour L101 and the advancing direction of the hole contour L102 are different from each other. For example, the advancing direction of the island contour L101 may be the counterclockwise direction, whereas the advancing direction of the hole contour L102 may be the clockwise direction.

Figure 4:
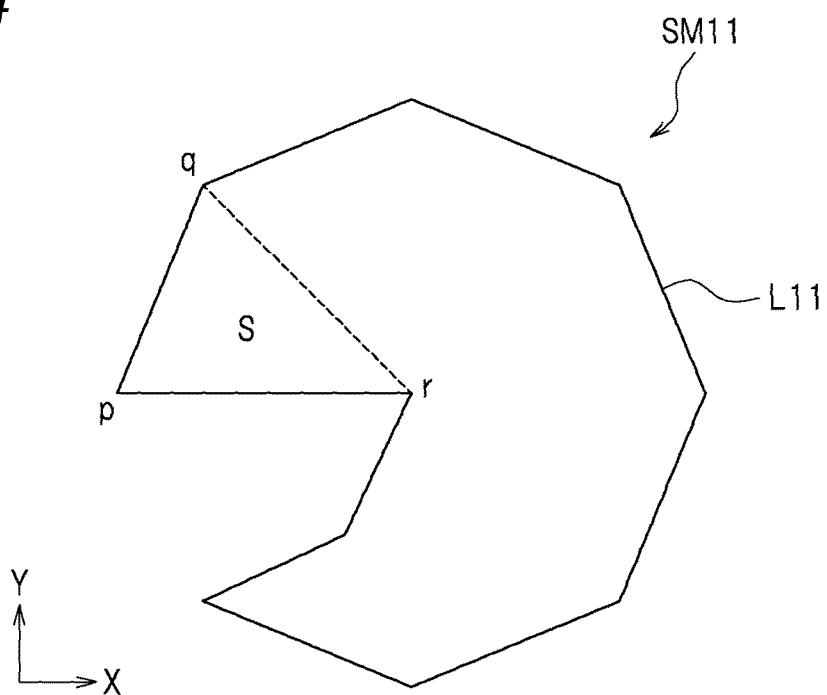
FIG. 4 shows a procedure of distinguishing whether a contour of a slice model is an island contour or a hole contour.

In the case where the advancing directions of the contours of the slice model are not clear and thus it is not clear whether each contour is an island contour or a hole contour, the determination on the contours may be performed as follows. FIG. 4 shows a procedure of determining whether a contour L11 of a slice model SM11 is an island contour or a hole contour. Hereinafter, the procedure of determining whether the contour L11 of the slice model SM11 is an island contour or a hole contour (hereinafter, referred to as "contour determination") will be described with reference to the slice model SM11 shown in FIG. 4. In this example, a "triangular area size with a sign" is used to perform the contour determination. The "triangular area size with a sign" is a triangle area size provided with a positive or negative sign. For example, in the case of the contour L11 defining a polygon as shown in FIG. 4, first, arbitrary protruding apex having an acute angle is extracted. In this example, apex p, for example, is extracted. Next, apex q and apex r, which are adjacent to apex p, are extracted. Then, an area size with a sign of triangle Δpqr is determined. Where the area size with a sign of triangle Δpqr is S, area size S is represented by the following expression (1).

$$S=(p_x-r_x)\cdot(q_y-r_y)-(q_x-r_x)\cdot(p_y-r_y) \qquad (1)$$

In expression (1), $p_x$ and $p_y$ respectively represent the x coordinate and the y coordinate of apex p. $q_x$ and $q_y$ respectively represent the x coordinate and the y coordinate of apex q. $r_x$ and $r_y$ respectively represent the x coordinate and the y coordinate of apex r. In the case where the area size S is smaller than "0", namely, in the case where the area size S is of a negative value, the contour L11 is determined to be an island contour. By contrast, in the case where the area size S is larger than "0", namely, in the case where the area size S is of a positive value, the contour L11 is determined to be a hole contour. Next, the area size with a sign of triangle Δpqr and the advancing direction of the contour L11 are associated with each other. In the case where the area size S is of a negative value, the advancing direction of the contour L11 is set to, for example, a first direction (in this example, clockwise direction). In the case where the area size S is of a positive value, the advancing direction of the contour L11 is set to a second direction (in this example, counterclockwise direction) opposite to the first direction.

It is difficult for a computer to determine which region of a slice model is a printing region and which region thereof is a non-printing region (hereinafter, such a determination will be referred to as a "region determination") merely with the above-described information (e.g., information on advancing directions of contours). Therefore, in this preferred embodiment, the region determination device 100 is used to perform a region determination on a slice model. The region determination device 100 determines which region of a slice model, obtained as a result of slicing, at a predetermined interval, a three-dimensional model of a three-dimensional printing object to be printed, is a printing region and which region thereof is a non-printing region. The region determination device 100 may be separate from the three-dimensional printing device 10A or may be built in the three-dimensional printing device 10A. For example, the region determination device 100 may be a computer and may include a ROM, a RAM or the like storing a program or the like to be executed by a CPU. In this example, a program stored on the computer is used to make a determination on the regions of the slice model. The region determination device 100 may be a computer dedicated for the three-dimensional printing system 10 or a multi-purpose computer.

Figure 5:
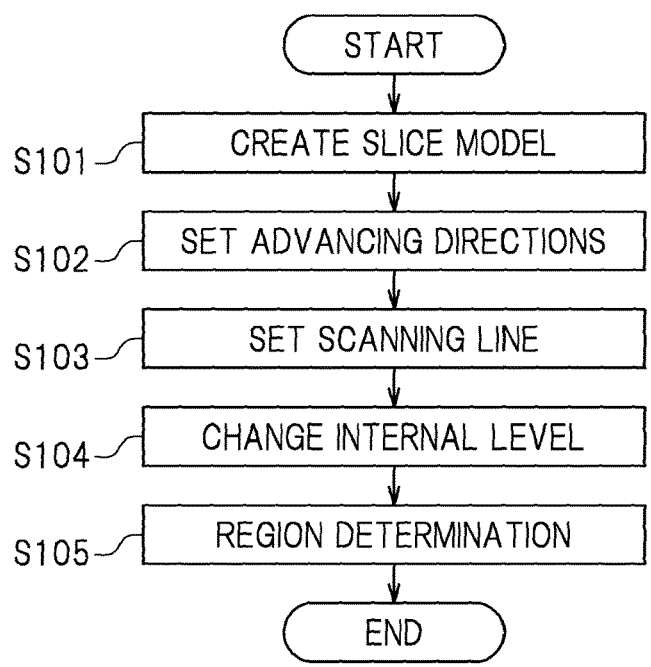
FIG. 5 is a flowchart showing a procedure of determining which region of the slice model is a printing region and which region thereof is a non-printing region.
Figure 6A:
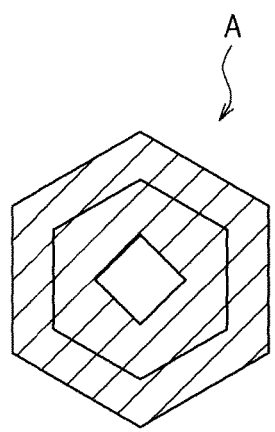
FIG. 6A shows an example of three-dimensional printing object and is a plan view thereof.
Figure 6B:
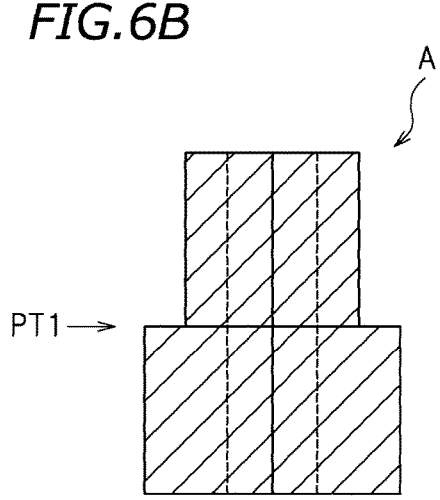
FIG. 6B shows the example of three-dimensional printing object and is a side view thereof.
Figure 7:
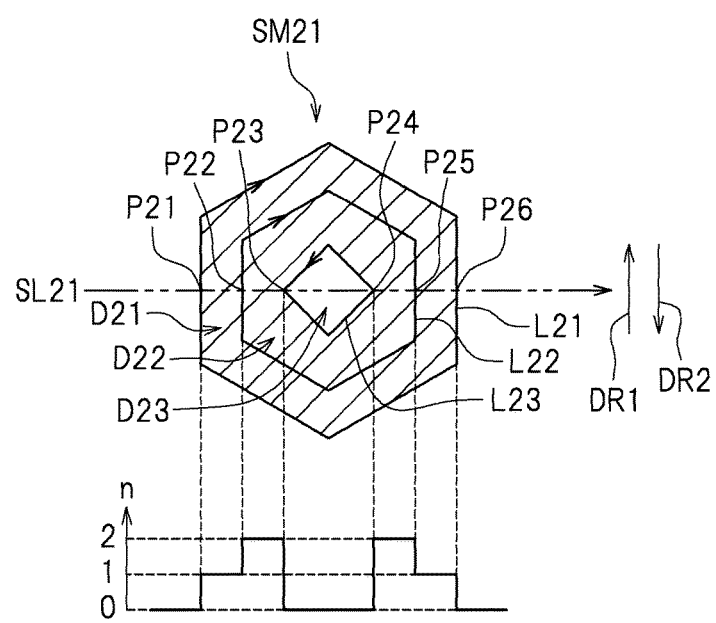
FIG. 7 shows a slice model obtained as a result of slicing the three-dimensional printing object at a position PT1 shown in FIG. 6B.

FIG. 5 is a flowchart showing a procedure of determining which region of a slice model is a printing region and which region thereof is a non-printing region. FIG. 6A is a plan view of a three-dimensional printing object A. FIG. 6B is a side view of the three-dimensional printing object A. FIG. 7 shows a slice model SM21 obtained as a result of slicing the three-dimensional printing object A at a position PT1 shown in FIG. 6B. In each of FIG. 6A, FIG. 6B and FIG. 7, the hatched region is a printing region. The three-dimensional printing object A has a shape including two columnar objects having different sizes stacked in an up-down direction. The three-dimensional printing object A has a central part thereof cut out as seen in the plan view. In FIG. 6B, the position PT1 is a border between the two columnar objects included in the three-dimensional printing object A. In this example, the slice model SM21 obtained as a result of slicing the three-dimensional printing object A at the position PT1 will be used to describe a procedure by which the region determination device 100 determines which region of the slice model SM 21 is a printing region and which region thereof is a non-printing region.

First, in step S101, a slice model is created. In this example, a three-dimensional model of the three-dimensional printing object A to be printed is sliced at a predetermined interval in a horizontal direction to create a plurality of two-dimensional slice models respectively corresponding to cross-sectional shapes of the three-dimensional printing object. The slice model SM21 shown in FIG. 7 is one of the plurality of created slice models. The slice model SM21 includes an island contour L21 and also includes another island contour L22 and a hole contour L23, which are inner to the island contour L21. The hole contour L23 is provided inner to the island contour L22. Namely, the island contour L22 is provided between the island contour L21 and the hole contour L23. In this preferred embodiment, the island contour L21 corresponds to the "first island contour", and the island contour L22 corresponds to the "second island contour".

Next, in step S102, an advancing direction is set for each of the contours of the slice model SM21. In this example, the advancing direction of each of the island contours L21 and L22 is set to the clockwise direction. By contrast, the advancing direction of the hole contour L23 is set to the counterclockwise direction.

Next, in step S103, a scanning line SL21 is set for the slice model SM21. The scanning line SL21 is used to divide the region of the slice model SM21 into a printing region and a non-printing region. The scanning line SL21 is set to cross the contours of the slice model SM21 and to be scanned in a predetermined direction. In this example, the predetermined direction of the scanning line SL21 is the left-to-right direction in FIG. 7. There is no specific limitation on the predetermined direction of the scanning line SL21. For example, the predetermined direction of the scanning line SL21 may be the right-to-left direction in FIG. 7 or the top-to-bottom direction in FIG. 7.

In this example, the region determination device 100 stores an internal level variable n as a variable (hereinafter, referred to also as an "internal level n"). The internal level n is a variable usable to divide the region of the slice model SM21 into a printing region and a non-printing region. Based on the value stored as the internal level n, the region determination device 100 determines which region of the slice model SM21 is a printing region and which region thereof is a non-printing region. In this example, the internal level n has an initial value of "0". The initial value is not limited to "0".

Next, in step S104, the value of the internal level n is changed in the predetermined direction of the scanning line SL21. In this example, first, intersections P21 through P26, at which the scanning line SL21 and the contours of the slice model SM21 cross each other are specified. The scanning line SL21 is scanned in the predetermined direction (in this example, in the left-to-right direction in FIG. 7), and when the scanning line SL21 crosses each of the contours of the slice model SM21, the value of the internal level n is changed. When the value of the internal level n is changed, the post-change value of the internal level n and the intersection at which the scanning line SL21 and the contour cross each other are stored on the region determination device 100 in the state where the post-change value of the internal level n and the intersection are associated with each other.

In this example, the value of the internal level n is changed in different manners in accordance with whether the contour crossing the scanning line SL21 is an island contour or a hole contour. Therefore, first, it is determined whether the contour crossing the scanning line SL21 is an island contour or a hole contour. In this example, the type of the contour is determined based on the advancing direction of the contour crossing the scanning line SL21. In the case where the advancing direction of the contour is clockwise, the contour is determined to be an island contour. By contrast, in the case where the advancing direction of the contour is counterclockwise, the contour is determined to be a hole contour.

Specifically, in the case of, for example, the contour L11 of the slice model SM11 shown in FIG. 4, area size S with a sign of a triangle defined by arbitrary apex p and apexes q and r adjacent to apex p is determined. In the case where the determined area size S is of a positive value, the contour L11 is determined to be a hole contour. By contrast, in the case where the determined area size S is of a negative value, the contour L11 is determined to be an island contour. In the case of the slice model SM21 shown in FIG. 7, the contours crossing the scanning line SL21 at the intersections P21, P22, P25 and P26 are determined to be island contours. The contours crossing the scanning line SL21 at the intersections P23 and P24 are determined to be hole contours.

In the case where the contour crossing the scanning line SL21 is an island contour, next, it is determined in which direction the island contour crosses the scanning line SL21. Based on the determination result, it is determined whether the value of the internal level n is to be increased by "1" or decreased by "1". In the case where, for example, the island contour is determined to cross the scanning line SL21 in a first direction (in this example, in the bottom-to-top direction in FIG. 7) DR1, the value of the internal level n is increased by "1". By contrast, in the case where the island contour is determined to cross the scanning line SL21 in a second direction (in this example, in the top-to-bottom direction in FIG. 7) DR2 opposite to the first direction DR1, the value of the internal level n is decreased by "1".

In the case where the contour crossing the scanning line SL21 is an island contour, it may be determined whether the value of the internal level n is to be increased or decreased by "1" by use of an exterior product. For example, it is assumed that the scanning line SL21 is vector a and the island contour crossing the scanning line SL21 is vector b. The exterior product a×b is calculated. Based on the direction of the vector calculated by the exterior product a×b, it is determined whether the value of the internal level n is to be increased or decreased by "1". In the case of, for example, FIG. 8A, vector a representing the scanning line SL21 is directed in a positive direction of an X-axis direction, and vector b representing the island contour crossing the scanning line SL21 is directed in a positive direction of a Y-axis direction. In this case, the vector calculated by the exterior product a×b is directed in a positive direction of a Z-axis direction. By contrast, in the case of FIG. 8B, vector a representing the scanning line SL21 is directed in the positive direction of the X-axis direction, and vector b representing the island contour crossing the scanning line SL21 is directed in a negative direction of the Y-axis direction. In this case, the vector calculated by the exterior product a×b is directed in a negative direction of the Z-axis direction. In this example, in the case where the vector calculated by the exterior product a×b is directed in the positive direction of the Z-axis direction, the value of the internal level n is increased by "1". By contrast, in the case where the vector calculated by the exterior product a×b is directed in the negative direction of the Z-axis direction, the value of the internal level n is decreased by "1".

In the case where the contour crossing the scanning line SL21 is a hole contour, next, it is determined in which direction the hole contour crosses the scanning line SL21. Based on the determination result, it is determined how the value of the internal level n is to be changed. In this example, a temporary retain variable m is stored on the region determination device 100. The temporary retain variable m is usable to temporarily retain the value of the internal level n. In this example, when the scanning line SL21 crosses a hole contour and thus the region is changed from a printing region to a non-printing region, the value of the internal level n is assigned to the temporary retain variable m. Then, "0" is substituted for the internal level n. By contrast, when the scanning line SL21 crosses a hole contour and thus the region is changed from a non-printing region to a printing region, the value of the temporary retain variable m is assigned back to the internal level n. The value of the temporary retain variable m that is assigned to the internal level n in this case is the temporary value obtained as a result of the value of the internal level n being assigned to the temporary retain variable m when the scanning line SL21 crosses the same hole contour and thus the region is changed from a printing region to a non-printing region. In this preferred embodiment, the value of the internal level n corresponding to a non-printing region is controlled to be "0".

In this example, when the hole contour is determined to cross the scanning line SL21 in the second direction (in the top-to-bottom direction in FIG. 7) DR2, the value of the internal level n is assigned to the temporary retain variable m. Then, "0" is substituted for the internal level n. By contrast, when the hole contour is determined to cross the scanning line SL21 in the first direction (in the bottom-to-top direction in FIG. 7) DR1, the value of the temporary retain variable m is assigned back to the internal level n.

Figure 8A:
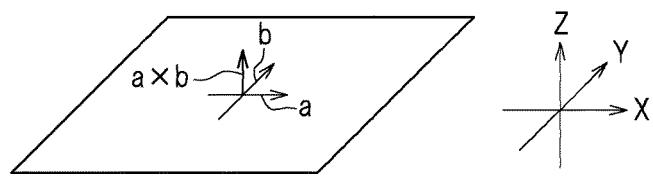
FIG. 8A shows a direction of a vector calculated by a×b, which is an external product of vector a and vector b.
Figure 8B:
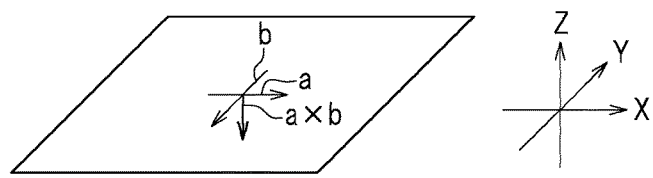
FIG. 8B shows a direction of a vector calculated by a×b, which is an external product of vector a and vector b.

In the case where the contour crossing the scanning line SL21 is a hole contour, it may be determined how the value of the internal level n is to be changed by use of an exterior product. It is assumed that in FIG. 8A and FIG. 8B, vector b represents a hole contour. In the case where as shown in FIG. 8B, the vector calculated by the exterior product a×b is directed in the negative direction of the Z-axis direction, the value of the internal level n is assigned to the temporary retain variable m and then "0" is substituted for the internal level n. By contrast, in the case where as shown in FIG. 8A, the vector calculated by the exterior product a×b is directed in the positive direction of the Z-axis direction, the value of the temporary retain variable m is assigned back to the internal level n.

In the slice model SM21 shown in FIG. 7, the island contours L21 and L22 cross the scanning line SL21 respectively at the intersections P21 and P22 in the first direction DR1. Therefore, the value of the internal level n is increased by "1" at each of the intersections P21 and P22. Specifically, the internal level n=1 at the intersection P21, and the internal level n=2 at the intersection P22. At the intersection P23, the hole contour L23 crosses the scanning line SL21 in the second direction DR2. Therefore, at the intersection P23, the value of the internal level n is assigned to the temporary retain variable m and "0" is substituted for the internal level n. Specifically, "2" is assigned to the temporary retain variable m. Next, at the intersection P24, the hole contour L23 crosses the scanning line SL21 in the first direction DR1. At the intersection P24, the value of the temporary retain variable m, namely, "2", is assigned back to the internal level n. Respectively at the intersections P25 and P26, the island contours L21 and L22 cross the scanning line SL21 in the second direction DR2. Therefore, at each of the intersections P25 and P26, the value of the internal level is decreased by "1". Specifically, the internal level n=1 at the intersection P25, and the internal level n=0 at the intersection P26.

Figure 9:
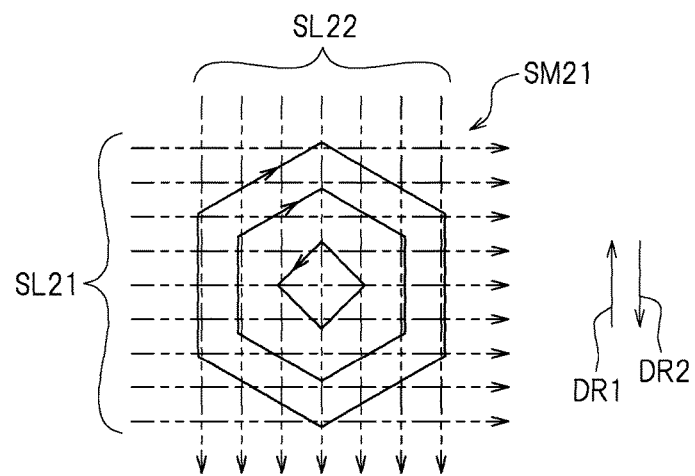
FIG. 9 shows a plurality of scanning lines set for the slice model.

With the above-described method, one scanning line SL2 is set for the slice model SM21. Alternatively, a plurality of scanning lines SL21 may be set. For example, as shown in FIG. 9, a plurality of scanning lines SL21 may be set in the same direction. In this example, the plurality of scanning lines SL21 preferably are provided at an equal interval or a substantially equal interval. Alternatively, the plurality of scanning lines SL21 are provided at different intervals. Another scanning line(s) SL22 may be set in a direction different from the direction of the scanning line(s) SL21. For example, the scanning line(s) SL22 may be set in a direction perpendicular or substantially perpendicular to the direction of the scanning line(s) SL21. There is no specific limitation on the number of the scanning line (s) SL22, and one scanning line SL22 or a plurality of scanning lines SL22 may be set. In such a structure, each of the scanning lines divides the region of the slice model SM21 into a printing region and a non-printing region. Therefore, the region of the SM21 is divided into a printing region and a non-printing region in more detail.

After the value of the internal level n is changed in step S104, it is determined, in step S105, which region of the slice model is a printing region and which region thereof is a non-printing region in accordance with the value of the internal level n. In this example, a region corresponding to a value of the internal level n that is not "0" is determined to be a printing region. By contrast, a region corresponding to the value of the internal level n that is "0" is determined to be a non-printing region.

In the slice model SM21 shown in FIG. 7, the region D21 between the island contour L21 and the island contour L22, and the region D22 between the island contour L22 and the hole contour L23, each correspond to a value of the internal level n that is not "0". Therefore, the regions D21 and D22 are each determined to be a printing region. By contrast, the region D23 inner to the hole contour L23 corresponds to the value of the internal value n that is "0". Therefore, the region D23 is determined to be a non-printing region.

The processes of steps S102 through S105 are performed also on the other slice models. In this manner, the region of each of the plurality of slice models corresponding to the cross-sectional shapes of the three-dimensional printing object A is divided into a printing region and a non-printing region.

After the region of each slice model is divided into a printing region and a non-printing region by the region determination device 100, the three-dimensional printing object A is printed in accordance with the slice models. For example, the slice model SM21 shown in FIG. 7 is used to print a cross-sectional shape corresponding to the slice model SM21. Specifically, the photocurable resin 23 located at positions corresponding to the printing regions D21 and D22 is irradiated with light emitted from the projector 31, and thus the photocurable resin 23 located at the positions corresponding to the printing regions D21 and D22 is cured. By contrast, the photocurable resin 23 located at a position corresponding to the non-printing region D23 is not irradiated with the light emitted from the projector 31. Thus, no cross-sectional shape is printed at the position corresponding to the non-printing region D23.

Figure 10:
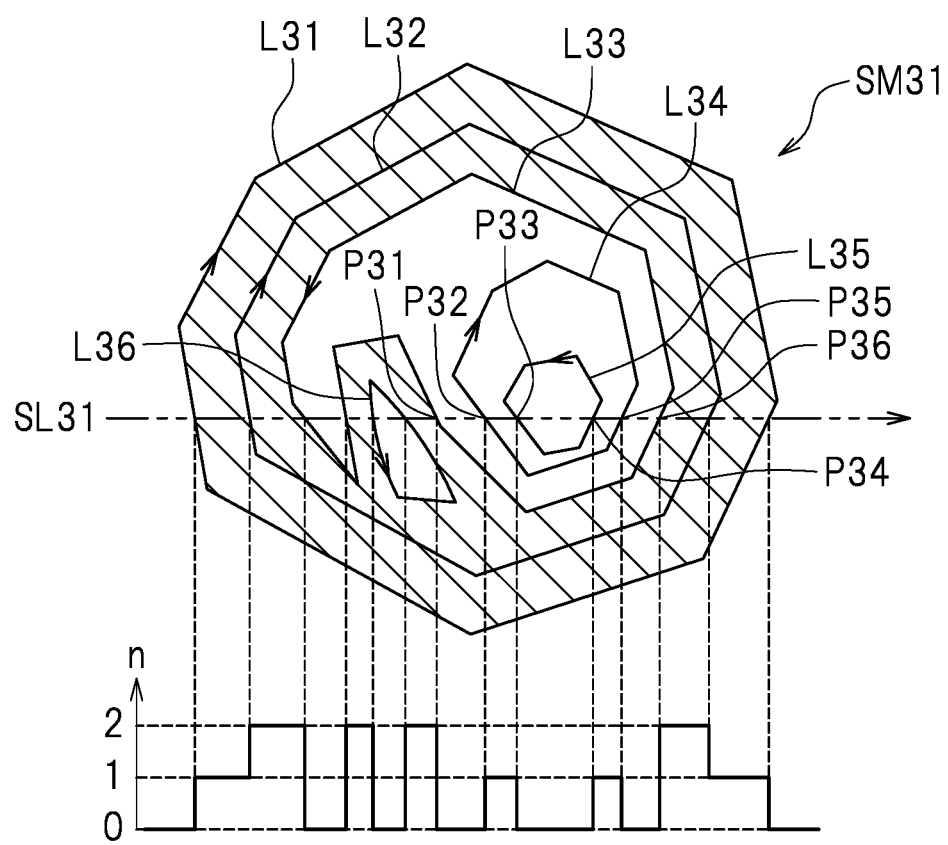
FIG. 10 shows another example of slice model.

The above-described method allows the region of any slice model to be divided into a printing region and a non-printing region. FIG. 10 shows an example of slice model SM31. FIG. 10 shows the slice model SM31 and a scanning line SL31 set for the slice model SM31. In FIG. 10, the hatched regions are printing regions. For example, the scanning line SL31 as shown in FIG. 10 is set for the slice model SM31. The scanning line SL31 is scanned in the left-to-right direction in FIG. 10 to change the value of the internal level n. In this example, the value of the internal level n is changed as shown in FIG. 10. In this example, the temporary retain variable m and a temporary retain variable m' substantially the same as the temporary retain variable m are set in the region determination device 100. The temporary retain variables m and m' may be different from each other or may form one variable having an array structure. In the case where the temporary retain variables m and m' form one variable having an array structure, the variables are preferably of a stack structure. For example, at an intersection P31, at which the scanning line SL31 crosses a hole contour L33, the value of the internal level n (n=2) is assigned to the temporary retain variable m and "0" is substituted for the internal level n. At an intersection P32, at which the scanning line SL31 crosses an island contour L34, the value of the internal level n is increased by "1", so that n=1. Next, at an intersection P33, at which the scanning line SL31 crosses a hole contour L35, the value of the internal level n (n=1) is assigned to the temporary retain variable m' and "0" is substituted for the internal level n. At an intersection P34, at which the scanning line SL31 crosses the hole contour L35, the value of the temporary retain variable m' is assigned back to the internal level n, so that n=1. At an intersection P35, at which the scanning line SL31 crosses the island contour L34, the value of the internal level n is decreased by "1", so that n=0. At an intersection P36, at which the scanning line SL31 crosses the hole contour L33, the value of the temporary retain variable m is assigned back to the internal level n, so that n=2. Regarding the other intersections, detailed descriptions will be omitted. A region corresponding to a value of the internal level n that is not "0" is determined to be a printing region. By contrast, a region corresponding to the value of the internal level n that is "0" is determined to be a non-printing region. In this manner, the region of even the slice model SM31 shown in FIG. 10 is divided into a printing region and a non-printing region.

In this preferred embodiment, as shown in FIG. 3, the region determination device 100 includes a storage processor 52, an advancing direction setting processor 54, a scanning line setting processor 56, an intersection specifying processor 58, a contour determination processor 60, a first internal level setting processor 62, a second internal level setting processor 64, and a region determination processor 66. The processors execute a computer program (hereinafter, referred to as a "program") stored on the region determination device 100.

The storage processor 52 is configured or programmed to store a printing object model of the three-dimensional printing object A to be printed by the three-dimensional printing system 10. The storage processor 52 is also configured or programmed to store the internal level n and the temporary retain variable m, which are variables.

The advancing direction setting processor 54 is configured or programmed to set, as shown in FIG. 7, an advancing direction for the island contours L21 and L22 of the slice model SM21 stored by the storage processor 52 and a different advancing direction for the hole contour L23 of the slice model SM21. In this example, the advancing direction setting processor 54 sets the clockwise direction as the advancing direction of the island contours L21 and L22. The advancing direction setting processor 54 sets the counterclockwise direction as the advancing direction of the hole contour L23. The advancing direction setting processor 54 executes the process of step S102 shown in FIG. 5.

The scanning line setting processor 56 is configured or programmed to set, for the slice model SM21 stored by the storage processor 52, the scanning line SL21 directed in a predetermined direction (e.g., in the left-to-right direction in FIG. 7) so as to cross the contours of the slice model SM21. The scanning line setting processor 56 executes the process of step S103 shown in FIG. 5.

The intersection specifying processor 58 is configured or programmed to execute, among the processes of step S104 shown in FIG. 5, a process of specifying the intersections P21 through P26, at which the contours of the slice model SM21 cross the scanning line SL21. The contour determination processor 60 is configured or programmed to execute, among the processes of step S104 shown in FIG. 5, a process of determining whether each of the contours crossing the scanning line SL21 at the intersections P21 through P26 specified by the intersection specifying processor 58 is an island contour or a hole contour.

The first internal level setting processor 62 is configured or programmed to execute, among the processes of step S104 shown in FIG. 5, a process regarding the change of the value of the internal level n in the case where the contour crossing the scanning line SL21 is an island contour. In the case where the contour crossing the scanning line SL21 is determined to be an island contour by the contour determination processor 60, when the island contour crosses the scanning line SL21 in the first direction DR1, the first internal level setting processor 62 increases the value of the internal level n by a predetermined value (in this example, "1"). By contrast, when the island contour crosses the scanning line SL21 in the second direction DR2 opposite to the first direction DR1, the first internal level setting processor 62 decreases the value of the internal level n by the predetermined value (in this example, "1"). The predetermined value amount by which the value of the internal level n is increased or decreased is not limited to "1". For example, the predetermined value may be "2" or "10".

The second internal level setting processor 64 is configured or programmed to execute, among the processes of step S104 shown in FIG. 5, a process regarding the change of the value of the internal level n in the case where the contour crossing the scanning line SL21 is a hole contour. In the case where the contour crossing the scanning line SL21 is determined to be a hole contour by the contour determination processor 60, when the hole contour crosses the scanning line SL21 in the second direction DR2, the second internal level setting processor 64 assigns the value of the internal level n to the temporary retain variable m. The second internal level setting processor 64 substitutes "0" for the internal level n. By contrast, when the hole contour crosses the scanning line SL21 in the first direction DR1, the second internal level setting processor 64 assigns the value of the temporary retain variable m back to the internal level n.

The region determination processor 66 is configured or programmed to determine a region corresponding to a value of the internal level n that is not "0" to be a printing region, the internal level n being set by the first internal level setting processor 62 and the second internal level setting processor 64. By contrast, the region determination processor 66 is configured or programmed to determine a region corresponding to the value of the internal level n that is "0" to be a non-printing region. The region determination processor 66 executes the process of step S105 shown in FIG. 5.

As described above, in this preferred embodiment, the second internal level setting processor 64 is configured or programmed to, when the hole contour crosses the scanning line SL21 in the second direction DR2 as shown in FIG. 7, assign the value of the internal level n to the temporary retain variable m and then substitute "0" for the internal level n. The second internal level setting processor 64 is configured or programmed to, when the hole contour crosses the scanning line SL21 in the first direction DR1, assign the value of the temporary retain variable m back to the internal level n. Therefore, in the slice model SM21, the value of the internal level n corresponding to the non-printing region, which is not to be printed, is made "0" with certainty. For this reason, even the region of the slice model SM21, in which the island contour L21 and the hole contour L23 have another island contour L22 therebetween, is divided into a printing region and a non-printing region with certainty.

In this preferred embodiment, the advancing direction setting processor 54 is configured or programmed to set the clockwise direction as the advancing direction of the island contour and set the counterclockwise direction as the advancing direction of the hole contour. Because of this structure, it is easily determined whether the contour crossing the scanning line SL21 is an island contour or an hole contour by determining whether the advancing direction of the contour crossing the scanning line SL21 is clockwise or counterclockwise.

In this preferred embodiment, the first internal level setting processor 62 is configured or programmed to, when the island contour crosses the scanning line SL21 in the first direction DR1, increase the value of the internal level n by "1". The first internal level setting processor 62 is configured or programmed to, when, by contrast, the island contour crosses the scanning line SL21 in the second direction DR2, decrease the value of the internal level n by "1". When the island contour crosses the scanning line SL21, the value of the internal level n is changed more easily.

In this preferred embodiment, as shown in FIG. 9, the scanning line setting processor 56 may be configured or programmed to set a plurality of the scanning lines SL21 and a plurality of the scanning lines SL22. This allows the region of the slice model SM21 into a printing region and a non-printing region with more certainty.

The processors of the region determination device 100, namely, the storage processor 52, the advancing direction setting processor 54, the scanning line setting processor 56, the intersection specifying processor 58, the contour determination processor 60, the first internal level setting processor 62, the second internal level setting processor 64, and the region determination processor 66, may be implemented by one processor included in the region determination device 100. Alternatively, the processors may be implemented by a plurality of processors. According to various preferred embodiments of the present invention, the expression "is configured or programmed" encompasses executing a computer program stored on a computer. Various preferred embodiments of the present invention encompass a non-transitory computer readable medium having the computer program stored thereon temporarily. Various preferred embodiments of the present invention encompass a circuit having substantially the same function as that of the program to be executed by each of the processors. In this case, the storage processor 52, the advancing direction setting processor 54, the scanning line setting processor 56, the intersection specifying processor 58, the contour determination processor 60, the first internal level setting processor 62, the second internal level setting processor 64, and the region determination processor 66 may be respectively replaced with a storage circuit 52, an advancing direction setting circuit 54, a scanning line setting circuit 56, an intersection specifying circuit 58, a contour determination circuit 60, a first internal level setting circuit 62, a second internal level setting circuit 64, and a region determination circuit 66.

The terms and expressions used herein are for description only and are not to be interpreted in a limited sense. These terms and expressions should be interpreted as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or discussed during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing system, comprising:
  a three-dimensional printing device that prints a three-dimensional printing object;
  a region determination device for a slice model, the region determination device dividing a region of the slice model into a printing region to be printed and a non-printing region not to be printed, the slice model being obtained as a result of slicing a three-dimensional model of a three-dimensional printing object at a predetermined interval and being defined by contours representing profiles of the three-dimensional printing object, wherein the contours include an island contour representing a shape of an outer profile of the printing region of the three-dimensional printing object and a hole contour representing a shape of a hole in the three-dimensional printing object, the region determination device comprising:

a storage processor that stores the slice model and an internal level variable and a temporary retain variable;

an advancing direction setting processor that sets an advancing direction for the island contour of the slice model stored by the storage processor and a different advancing direction for the hole contour of the slice model;

a scanning line setting processor that sets, for the slice model stored by the storage processor, a scanning line directed in a predetermined direction so as to cross the contours;

an intersection specifying processor that specifies intersections at which the contours and the scanning line cross each other;

a contour determination processor that determines whether each of the contours crossing the scanning line at the intersections specified by the intersection specifying processor is the island contour or the hole contour;

a first internal level setting processor that, in a case in which the contour crossing the scanning line is determined to be the island contour by the contour determination processor, when the island contour crosses the scanning line in a first direction, increases a value of the internal level variable by a predetermined value, and when the island contour crosses the scanning line in a second direction opposite to the first direction, decreases the value of the internal level variable by the predetermined value;

a second internal level setting processor that, in a case in which the contour crossing the scanning line is determined to be the hole contour by the contour determination processor, when the hole contour crosses the scanning line in the second direction, assigns the value of the internal level variable to the temporary retain variable and then substitutes "0" for the internal level variable, and when the hole contour crosses the scanning line in the first direction, assigns a value of the temporary retain variable back to the internal level variable;

a region determination processor that determines a region, corresponding to a value of the internal level variable that is not 0, to be the printing region and determines a region, corresponding to the value of the internal level variable that is 0, to be the non-printing region, the internal level variable being set by the first internal level setting processor and the second internal level setting processor, wherein the three-dimensional printing device prints the three-dimensional printing object according to the printing region and the non-printing region determined by the region determination processor.

2. The three-dimensional printing system according to claim 1, wherein
the advancing direction setting processor is configured or programmed to set a clockwise direction as the advancing direction of the island contour and set a counterclockwise direction as the advancing direction of the hole contour; and the contour determination processor is configured or programmed to, in a case in which the advancing direction of the contour crossing the scanning line at the intersection is the clockwise direction, determine the contour to be the island contour, and in a case in which the advancing direction of the contour crossing the scanning line at the intersection is the counterclockwise direction, determine the contour to be the hole contour.

3. The three-dimensional printing system according to claim 1, wherein the first internal level setting processor is configured or programmed to, when the island contour crosses the scanning line in the first direction, increase the value of the internal level variable by 1, and when the island contour crosses the scanning line in the second direction, decrease the value of the internal level variable by 1.

4. The three-dimensional printing system according to claim 1, wherein the scanning line setting processor is configured or programmed to set a plurality of the scanning lines for the slice model.

5. A method of printing a three-dimensional object including a region determination method for a slice model, the region determination method dividing a region of the slice model into a printing region to be printed and a non-printing region not to be printed, the slice model being obtained as a result of slicing, at a predetermined interval, a three-dimensional model of a three-dimensional printing object to be printed and being defined by contours representing profiles of the three-dimensional printing object, wherein the contours include an island contour representing a shape of an outer profile of the printing region of the three-dimensional printing object and a hole contour representing a shape of a hole in the three-dimensional printing object, the region determination method comprising:

a storage step of storing the slice model;

an advancing direction setting step of setting an advancing direction for the island contour of the slice model stored in the storage step and a different advancing direction for the hole contour of the slice model;

a scanning line setting step of setting, for the slice model stored in the storage step, a scanning line directed in a predetermined direction so as to cross the contours;

an intersection specifying step of specifying intersections at which the contours and the scanning line cross each other;

a contour determination step of determining whether each of the contours crossing the scanning line at the intersections specified in the intersection specifying step is the island contour or the hole contour;

a first internal level setting step of, in a case in which the contour crossing the scanning line is determined to be the island contour in the contour determination step, when the island contour crosses the scanning line in a first direction, increasing a value of the internal level variable by a predetermined value, and when the island contour crosses the scanning line in a second direction opposite to the first direction, decreasing the value of the internal level variable by the predetermined value;

a second internal level setting step of, in a case in which the contour crossing the scanning line is determined to be the hole contour in the contour determination step, when the hole contour crosses the scanning line in the second direction, assigning the value of the internal level variable to a temporary retain variable and then substituting "0" for the internal level variable, and when the hole contour crosses the scanning line in the first direction, assigning a value of the temporary retain variable back to the internal level variable;

a region determination step of determining a region, corresponding to a value of the internal level variable that is not 0, to be the printing region and determining a region, corresponding to the value of the internal level variable that is 0, to be the non-printing region, the internal level variable being set in the first internal level setting step and the second internal level setting step; and an emission step of emitting light to a photocurable resin according to the printing region and the non-printing region determined in the region determination step.

6. The method of printing a three-dimensional object according to claim 5, wherein in the advancing direction setting step, a clockwise direction is set as the advancing direction of the island contour and a counterclockwise direction is set as the advancing direction of the hole contour; and in the contour determination step, in a case in which the advancing direction of the contour crossing the scanning line at the intersection is the clockwise direction, the contour is determined to be the island contour, and in a case which the advancing direction of the contour crossing the scanning line at the intersection is the counterclockwise direction, the contour is determined to be the hole contour.

7. The method of printing a three-dimensional object according to claim 5, wherein in the first internal level setting step, when the island contour crosses the scanning line in the first direction, the value of the internal level variable is increased by 1, and when the island contour crosses the scanning line in the second direction, the value of the internal level variable is decreased by 1.

8. The method of printing a three-dimensional object according to claim 5, wherein in the scanning line setting step, a plurality of the scanning lines are set for the slice model.

9. The method of printing a three-dimensional object according to claim 7, wherein the island contour includes a first island contour representing an outer profile of the printing region and a second island contour provided between the first island contour and the hole contour and representing an outer profile of the printing region;

the internal level variable has an initial value of 0;

in the first internal level setting step, when the first island contour crosses the scanning line in the first direction, the value of the internal level variable is increased by 1, and when the second island contour crosses the scanning line in the first direction, the value of the internal level variable is increased by 1, so that the value of the internal level variable is 2;

in the second internal level setting step, when the hole contour crosses the scanning line in the second direction, the value of the internal level variable, which is 2, is assigned to the temporary retain variable and then 0 is substituted for the internal level variable, and when the hole contour crosses the scanning line in the first direction, the value of the temporary retain variable, which is 2, is assigned back to the internal level variable; and in the first internal level setting step, when the second island contour crosses the scanning line in the second direction, the value of the internal level variable is decreased by 1, so that the value of the internal level variable is 1, and when the first island contour crosses the scanning line in the second direction, the value of the internal level variable is decreased by 1, so that the value of the internal level variable is 0.

10. The three-dimensional printing system according to claim 1, wherein the three-dimensional printing device includes a projector and a controller that controls the projector to emit light to a photocurable resin located at positions corresponding to the printing region and not to emit light to a photocurable resin located at positions corresponding to the non-printing region.

11. The method of printing a three-dimensional object according to claim 5, wherein the emission step includes emitting light to a photocurable resin located at positions corresponding to the printing region without emitting light to a photocurable resin located at positions corresponding to the non-printing region.

* * * * *